Feb. 21, 1928.

J. S. WATTS 1,659,645

VARIABLE SPEED OIL WELL RIG DRIVE

Filed April 19, 1926  2 Sheets-Sheet 1

INVENTOR
JOHN S. WATTS
BY
ATTORNEY

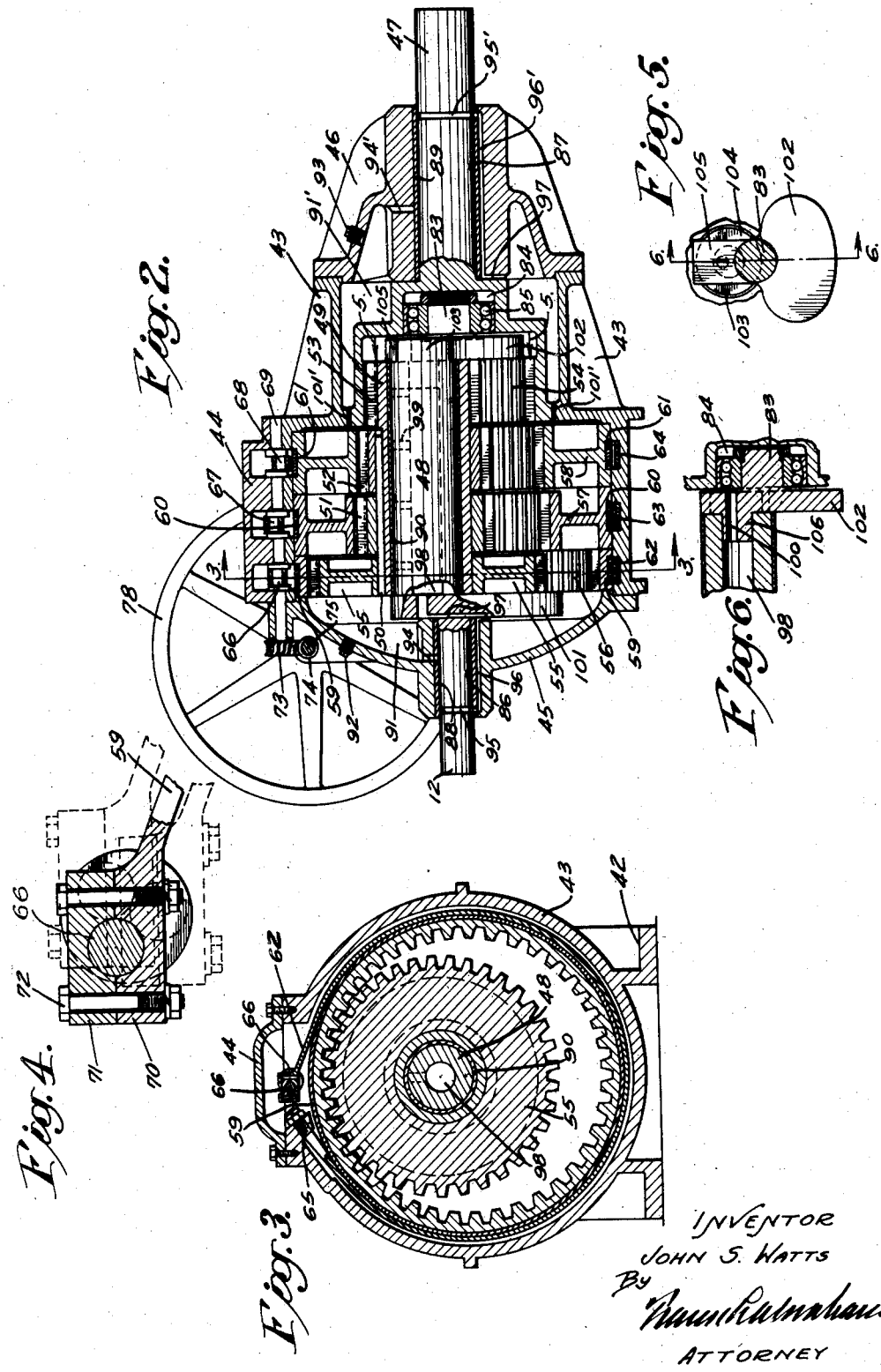

Patented Feb. 21, 1928.

1,659,645

UNITED STATES PATENT OFFICE.

JOHN S. WATTS, OF LOS ANGELES, CALIFORNIA.

VARIABLE-SPEED OIL-WELL-RIG DRIVE.

Application filed April 19, 1926. Serial No. 102,937.

The general object of my present invention being indicated by the above designation, it may be understood to be a purpose of the same to provide novel and improved means, suitable for use in conjunction with a single electric motor, or its equivalent, in operating the various rotatable devices of an oil well rig.

In the comparatively crude installations currently employed for the reciprocation of a walking beam, to operate a pump, and in the manipulation of band wheels, calf wheels, bull wheels, and the like, these being commonly mounted upon separate shafts, it is usual to provide the shaft of a band wheel not only with a crank for the mentioned reciprocation of a walking beam but also with flexible transmission means, controllable by separate clutch levers, or the like, for causing, at will, rotation of the mentioned separate shafts,—a friction pulley being ordinarily used in imparting rotation to the sand reel shaft; and it is an object of a preferred form of my invention to dispense with the mentioned flexible transmission means, including belts, chains and ropes,—simplifying the transmission in a manner which is rendered possible by the employment of a special reducing gear and by the use of a single main shaft, preferably carrying quills which are separately engageable therewith, as hereinafter described.

Although several types of reducing gear of the general character referred to have been disclosed in and made the subject-matter of my separate patent application, Serial No. 81979, filed January 18, 1926, I herein disclose and claim various details of a somewhat specialized reducing-gear organization comprising means whereby a comparatively precise regulation of speed may be easily and reliably effected,—this regulating means being such as to provide not only for the use of a plurality of gear ratios but such as to permit, by a control of slippage, for intermediate speeds,—actual reversing means within the reducing gear organization being ordinarily unnecessary, (unless in connection with a gas or oil engine) although within the scope of my invention, and capable of incorporation in the general manner described in my mentioned copending application.

It is an object of my present invention to provide oil well rig drive means comprising a single comparatively long shaft, suitably supported, this shaft being preferably connected with one of my special speed-reducing units, or its equivalent, and having thereon a quill or quills provided with means for the manipulation of cables, as for the pulling of tubes or rods, and with means for the manipulation of bailing equpment,—and a flexible coupling or couplings being optionally interposed between the mentioned speed-reducing mechanism and said shaft, to allow for any misalignment of shaft and reduction gear.

It is an object of preferred forms of this invention, in which one or more of the mentioned quills may carry not only a reel but a brake wheel, to provide simple means whereby various velocities may be easily and reliably imparted, subject to manipulation of a hand wheel or lever, to a main shaft, the rotation of this shaft being employed, as indicated, for a wide variety of uses, as by a mere shifting of the mentioned clutch elements,—which may comprise parts disposed concentrically of said shaft and splined thereon; and although, in the case of new installations I may prefer to dispense entirely with a so-called band wheel and/or bull wheel (relying upon a calf wheel, or its equivalent, operated at various speeds, both to pull tubes and to pull rods), the principles of my invention and the reducing-gear organization hereinafter described, are suitable for use in rotating the shafts of band wheels of existing installations,—these shafts being, in the case of the compromise installations last referred to, provided with jaw clutches on sprocket wheels and corresponding sprocket chains being respectively employed in driving, say, a usual band wheel and a usual calf wheel. In any case, no usual bull wheel need be provided, since the range of speed-variation, as hereinafter described, is such that a single drum may be utilized to do both the work of a bull wheel and that of a calf wheel.

Other objects of my invention, all forms of which include the use of a main shaft having a crank (not necessarily provided with a clutch) and carrying a separately revoluble member such as a quill or quills (preferably provided with separate bearings and with separate brake wheels and with clutch elements coaxially disposed,—and optionally connected, in the indicated manner, with a prime mover such as a compound-wound electric motor), may be best appreciated from the following description of an illustrative embodiment of my invention, taken in connection with the appended claims and the accompanying drawings, in which Fig. 1 is a diagrammatic top plan view, with parts broken away or omitted.

Fig. 2 is a vertical longitudinal section of a preferred type of speed-reducing transmission, this view being taken substantially as indicated by the arrow 2 of Fig. 1.

Fig. 3 is a transverse vertical section taken substantially as indicated by the line 3—3 of Fig. 2.

Fig. 4 is a detail view, upon an enlarged scale, corresponding to an upper central portion of Fig. 3.

Fig. 5 is a detail view, taken substantially as indicated by the line 5—5 of Fig. 2.

Fig. 6 is a vertical sectional detail view, taken substantially as indicated by the line 6—6 of Fig. 5.

Referring to the details of that specific embodiment of my invention chosen for purposes of illustration, 11 may be a source of power, such as an electric motor, the shaft 12 thereof being coupled with a coaxial shaft 13 of a speed-reducing transmission unit 14,—the latter being in turn connected (preferably by means of one or more flexible couplings 15, 16, to provide for misalignment or vibration) with a comparatively long main shaft 18; and by or from this main shaft 18, the various rotatable devices appropriate to an oil well pumping rig may be operated. The main shaft 18, or its equivalent, may be carried by means such as frame elements 19, 19', shown as supported from the same plate 20 to which the motor 11 and the transmission 14 are secured; and it may carry not only a terminal crank 21, suitable for the reciprocation of a walking beam, (not shown) but also concentrically disposed quills 22 and/or 23,—the former being shown as supported by additional frame elements 24, 24', and the latter being shown as supported by similar frame elements 25, 25'.

In the illustrated embodiment of my invention (upper or removable bearing elements being omitted from the showing in Fig. 1) a quill 22 may comprise or be carried by bearing castings 26, 26',—the latter of these being integral with one part (27) of a clutch; and these bearing castings are shown as cooperating in the support of a drum or spool 28,—one end of this spool being shown as provided with a brake wheel 29 and the other as provided with a calf wheel 30; and the quill 23 is shown as similarly constructed from bearing castings 31, 31' (the latter being integral with a clutch element 32) carrying a cylindrical body 33. This body may have secured thereto an end disc 34 and an intermediate disc 35 and/or a brake wheel 36.

Assuming that the quills 22 and 23 are not likely to be used simultaneously, the shaft 18 is shown as having splined thereon a single movable clutch element 37, one jaw (38) thereof being movable into engagement with the cooperating jaw 27 of the clutch element 32, on what I may term the calf wheel quill 22 and the other jaw (39) being similarly movable, upon an opposite movement of the splined element 37 (as by means of a fork engaging a central groove therein, in a known manner) to effect an engagement with a clutch jaw of the clutch element 32 upon what I may term the sand reel quill 23; but it is probable that the use of a simplified and consolidated direct drive for oil rigs, as herein described, is rendered practicable only by reason of the present availability of a suitable simple, rugged and comparatively inexpensive speed-reducing transmission and control unit,—such as is shown diagrammatically at 14, Fig. 1, and in detail in subsequent figures.

Assuming the motor 11 to be, for example, a compound wound electric motor including a reversing means and including alternative connections whereby speeds such as 475 and 940 R. P. M. may be obtained at will, a flexible coupling being preferably interposed at 40 in case the motor 11 and the control unit 14 are provided with separate bases 41 and 42, said control unit may comprise a main case or body 43, shown as having at the top thereof a removable section 44,—the respective ends of the main body being closed by end sections 45 and 46, respectively providing bearings for the drive shaft 12 and for a coaxial driven shaft 47.

Between the mentioned shafts I show an eccentric or crank 48 as carrying an interior composite gear comprising a hollow shaft or tube 49, on which are rigidly secured (as by means of a key 50) a plurality of gears. Disregarding, for the moment, alternative gears 51 and 52, the mentioned composite gear may be regarded as comprising an integral small gear 53, constantly in mesh with a secondary main gear 54 (which is shown as integral with the driven shaft 47) and a large gear 55, at the opposite end of the tube 49. The large gear 55 may be assumed constantly to engage a ring gear or primary main gear 56, which may be releasably held stationary by any suitable means.

Under the conditions indicated, assuming the gears 53 and 55 to be provided, as shown, with unequal numbers of teeth (the gear 53 being, for example, provided with sixteen teeth, and the gear 55 with thirty-five teeth, and the ring gears 54 and 56 respectively provided with 24 and 43 teeth), applying a formula as explained in my mentioned copending application, and assuming the gear 56 to be held stationary and the gear 55 to be caused, by engagement therewith, to be rotated upon its own axis (by reason of the rolling engagement with ring gear 56, held stationary) and to impart corresponding rotation to the gear 53 (thereby rotating the secondary main gear 54 and shaft 47 at a rate dependent upon the mentioned gear ratios) a speed-reducing effect in a ratio such as 5½ to 1 may be reliably obtained; and since the alternative gears 51 and 52 are also rigidly secured upon the tubular element 49, or its equivalent, and are respectively in constant mesh with alternative ring gears 57 and 58, it will be appreciated that, by releasing the ring gear 56, and holding one of the mentioned alternative ring-gears, 57 or 58, relatively to the main casting 43, or its equivalent, an alternative ratio of speed-reduction may be quickly and reliably obtained.

For example, the gear 51 on the tubular element 49 may be provided with twenty teeth, and it may roll within a ring gear provided with 28 teeth, producing a speed reduction in the ratio of 15 to 1; and the gear 52 may be provided with 19 teeth engaging a ring gear 58, provided with 27 teeth, to produce a speed reduction in the ratio of 19 to 1. That is to say, referring to the ring gears 56, 57 and 58 as primary main gears and letting the letter "$a$" stand for the number of teeth in a primary main gear, held stationary and letting "$b$" stand for the number of teeth in a small gear or pinion (such as 55, 51, or 52) in mesh therewith, "$c$" standing for the number of teeth in the rotatable or secondary main or ring gear 54, "$d$" representing the number of teeth in the small pinion or gear 53, or its equivalent (integrally or otherwise rigidly connected, as by the tubular element 49, with the gears 55, 51 and 52) the ratio in angular velocity or R. P. M. between shafts such as the drive shaft 12 and the driven shaft 47 may, in all forms of my speed-reducing control unit, be found from the following general formula:

$$\text{Ratio} = 1 - \left(\frac{a}{b} \times \frac{d}{c}\right)$$

Although any one of a great variety of means may be employed to hold, at will, any one of the mentioned primary mentioned gears stationary while permitting the others to float within the casing 43, or its equivalent, I show, in this application, a form of holding means which has the advantage that it may permit a limited relative slippage,—as for the purpose of obtaining speed-reductions intermediate between those mentioned. For example, I may surround each of the gears 55, 51 and 52 with a friction ring or brake lining 59, 60, 61, engageable by a clutch or brake band 62, 63, 64,—one end of each of these brake bands being rigidly secured in the general manner shown at 65, Fig. 3, and the opposite end thereof being provided with any suitable tightening means, such as cranks 66, 67, 68 on a shaft 69. This shaft may be provided with bearings in the fixed casting 43 and/or the removable casting 44, or the equivalents of these elements, and/or in the end casting 45

In order that a tightening of one of the mentioned brake bands may incidentally effect a release of any other previously under tension, for the holding of a primary gear in fixed relationship to the main casting 43, I may offset the mentioned cranks 66, 67 and 68, or their equivalents, at angular intervals, such as 120° (as best indicated in Fig. 4, in which the free end of brake band 59 is shown as provided with a bearing comprising an integral element 70 and a removable element 71, secured together by screws or bolts 72), and I may secure upon one end of the crank shaft 69, or its equivalent, any suitable means for manually or mechanically rotating the same.

It being often important to avoid a sudden shift from a high speed to a very low speed, or vice versa, and advantageous to provide for the rotation of the shaft 69, or its equivalent, from various near or remote positions, I suggest, in Figs. 1 and 2, the employment of a worm gear 73, upon the shaft 69,—imparting rotation thereto by means such as a worm 74; and this worm may be provided upon an inner section 75 of a two-part shaft comprising also an outer section 76 (which may be connected thereto, as at 77, by means such as a gimble bearing, in case the mentioned sections are not coaxial) and the outer end of the shaft section 76 may be provided with rotating means such as a hand wheel 78. This hand wheel is shown as provided with stop 79, limiting the rotation of said hand wheel to one revolution relatively to a fixed stop 81. This stop may serve also as a pointer, and it may be provided with graduations or marks 82, by which the operative in charge may be exactly informed as to relative positions of parts and/or consequent speed reducing effects.

The principles and functions of my speed-reducing control being indicated above, I may mention that, to facilitate assembly, replacement of parts and lubrication (the crank or eccentric 48 being shown as integral with the drive shaft 12 and as supported at its inner end by a complemental crank element 83, rotating in a central depression 84, opposite the inner end of driven shaft 47, and there provided with bearings 85) the bearing 86 of the driven shaft 12, where the same extends through the end element 45 (as also the bearing 87 of the shaft 47 within the end casing element 46, and optionally also the interior of the tubular element 49 comprised in the interior composite gear, which is rotatable upon the crank or eccentric 48) may be provided with special linings, as at 88, 89 and 90,—and about and/or through these linings a suitable lubricant may be advanced by way of any suitable conduits or passages. For the purpose last referred to, optionally so shaping the mentioned castings 45 and 46, or their equivalents, as to provide a lubricant chamber or chambers (as at 91 and 91′) assuming a suitable oil or grease to be introduced thereto (as by way of plugged openings 92 and/or 93) such lubricant may be permitted to advance between all relatively movable parts,—as by way of channels 94, 95, 96 and 97, in the casting 45, and by way of channels 94′, 95′, 96′ and 97′ in the casting 46,— the crank or eccentric 48 being shown as provided with additional passages 98 and 99, the former of these optionally connecting, as best shown in Fig. 6, with a passage 100, leading to chamber 84 containing bearings 85.

Additional bearings may be provided, as at 101′, and, to produce a counter-balancing effect, the castings and/or the member or members comprising shaft 12 and crank or eccentric 48, (and also the complemental casting or crank element 83) may be provided with integral enlargements, somewhat as shown at 101 and 102 (Figs. 2, 5 and 6). The mentioned crank elements may interfit without a threaded connection, in substantially the manner indicated in the last mentioned figures,—the inner end of the crank or eccentric 48 being shown as bifurcate to provide extensions 103 and 104 between which a rectangular portion 105 of the complemental crank element 83 laterally projects; and the last mentioned parts may be held in their indicated relationships, not only by a perfection of fit and/or suitable end pressure, but by means of a cylindrical projection 106 within the lubricating passage 98, or its equivalent.

To facilitate operation from a single control center, assuming the motor 11 to be provided with a speed-changing lever and/or with a reversing lever (somewhat as diagrammatically indicated at "S" and at "R," Fig. 1) if the unit 14 is organized substantially in the manner above described, the low speed operation of a suitable compound-wound motor (such as a 20–50 H. P. motor offering say 475 and 490 R. P. M.) may, according to the adjustment of the lever or hand wheel 78, or its equivalent, provide for the rotation of the main shaft 18, or its equivalent, at speeds such as 25 R. P. M. 31.7 R. P. M. and 86.4 R. P. M.,— up to 170 R. P. M. being obtainable by the use of the 20 horse power winding of the motor or 49.5, 62.7 and 172.8 by the use of the 50 H. P. motors; and it will be understood that not only the clutch member 32, or its equivalent, but brake organizations of any preferred character, operating on the respective brake wheels 29 and 36, may also be manipulated from a central point,—a clutch fork 107 being shown as movable by a shaft 108 carrying a lever arm 109, to which is pivoted a reach-rod 110, terminating in a handle 111, and additional levers or handles 112 and 113 being optionally connected with reach-rods 114 and 115 for the manipulation of levers 116 and 117 respectively connected with brake elements of any preferred type (not shown in detail) adapted to engage the respective brake wheels 29 and 36.

The mode of operation of my variable-speed oil well rig drive having been outlined incidentally to the description of its respective parts, it will be understood that the crank 21, or its equivalent, may be used for such purposes as the reciprocation of a walking beam (not shown) or the like, in an ordinary manner; and that the pitman by which such reciprocation is effected may or may not be disconnected during the use of one or both of the mentioned quills for one of the purposes indicated above; but it is of great practical importance that, without being required to change pulleys, or to stop a motor and to make any similar time-consuming changes, my described organization offering a wide range of speeds upon the mere manipulation of levers or other handles, the operative may get, by a suitable rotation of the hand wheel 78, or its equivalent, in the main shaft 18, speeds such as 25 R. P. M. (by holding stationary the ring gear 58) or 31.7 R. P. M. (by holding stationary the ring gear 57) or 86.4 R. P. M. (by holding stationary the ring gear 56) but also intermediate and lesser rates of rotation. That is to say, instead of using (say) 15 horse power and 30 R. P. M. (as in many existing rigs) the operative may, either tighten one of the brake bands 59, 60, 61 to such an extreme degree as to completely prevent the rotation of the corresponding ring gear, or he may permit slight relative slippage, by a suitable adjustment of the hand wheel 78, such as to produce intermediate pumping speeds, and/or speeds substantially below 25 R. P. M.

In operating the sand reel by such a shifting of the clutch 32, or its equivalent, as to cause the same to rotate with the shaft 18, the operative may employ, for example, the 50 H. P. winding of the motor 11, or its equivalent; and may accordingly obtain up to 170 R. P. M.; and it is of great practical importance that he can nevertheless start so slowly as to avoid special strains and that he can momentarily reduce speed, as to permit the motor 11, or other units of the described organization, to cool; and any desired braking effect may be obtained, in the indicated manner, by a suitable application of braking pressure to the wheel 36, or its equivalent.

Requiring no separate bull wheel, I may, as indicated above use the described calf wheel 30, or its equivalent, and/or the spool 28, or its equivalent, either in the pulling of tubes or in the pulling of rods,—using say, 25 R. P. M., at the start, in the pulling of tubes, and then shifting to 51.7 R. P. M.; and in pulling rods I may, using the 50 H. P. winding, start at, say, 49.5 R. P. M., then shifting to 62.7 R. P. M.,—the described organization enabling me to speed up without increasing the load, and to execute all operations at a maximum rate consistent with economy and efficiency, obviating overloads.

Although I have herein described a single, complete embodiment of my invention, it should be understood not only that various features thereof might be independently employed, but that numerous additional modifications might be made, by those skilled in the art to which this case relates, without involving the slightest departure from the spirit and scope of my invention, as the same is indicated above and in the following claims.

I claim as my invention:

1. In a well rig drive: a drive shaft; a main driven shaft provided with a beam-reciprocating crank; a quill, on the last mentioned shaft, provided with a sand reel; means for causing said quill, at will, to rotate with said shaft all of the mentioned members being disposed substantially in coaxial alignment; and means, interposed between said shafts, for varying, at will or in a pre-determined ratio, the rate of rotation of said driven shaft relatively to said drive shaft.

2. In a well rig drive: a drive shaft; a main driven shaft provided with a beam-reciprocating crank; a quill, on the last mentioned shaft, provided with a sand reel; means for causing said quill, at will, to rotate with said shaft; and means interposed between said shafts for varying, at will or in a pre-determined ratio, the rate of rotation of said driven shaft, relatively to said drive shaft,—all of the mentioned members being disposed substantially in coaxial alignment, and said speed-reducing means being connected with one of the mentioned shafts by a plurality of flexible couplings.

3. An oil well rig drive comprising: a motor provided with a shaft and with means for changing its speed and/or direction of rotation; a main shaft carrying a crank; a plurality of quills provided with separate clutch elements, all of the mentioned members being disposed substantially in coaxial alignment; and a speed-changing transmission and control unit interposed between said shafts.

4. An oil well rig drive comprising: a motor provided with a shaft and with means for changing its speed and/or direction of rotation; a main shaft carrying a crank; a plurality of quills provided with separate clutch elements, all of the mentioned members being disposed substantially in coaxial alignment; and a speed-changing transmission and control unit interposed between said shafts, said control unit being provided with means for its operation by a shaft extending toward an operative at a distance.

5. An oil well rig drive comprising: a motor provided with a shaft and with means for changing its speed and/or direction of rotation; a main shaft carrying a crank; a plurality of quills provided with separate clutch elements, all of the mentioned members being disposed substantially in coaxial alignment; and a speed-changing transmission and control unit interposed between said shafts,—said control unit being provided with means for its operation by a shaft extending toward an operative at a distance, and said clutches being also engageable and disengageable by means also extending within reach of the same operative.

6. An oil well rig drive comprising: a motor provided with a shaft and with means for changing its speed and/or direction of rotation; a main shaft carrying a crank; a plurality of quills provided with separate clutch elements, all of the mentioned members being disposed substantially in coaxial alignment; and a speed-changing transmission and control unit interposed between said shafts,—said control unit being provided with means for its operation by a shaft extending toward an operative at a distance, said clutches being also engageable and disengageable by means extending within reach of the same operative, said motor being provided with means for operating the same at various powers, and being provided for reversing the direction of rotation of said main shaft.

7. An oil well rig drive comprising: a base plate; a motor; a speed-reducing control unit; a main shaft carrying a quill; a crank; a clutch element and a brake; and means for supporting all of the mentioned elements in substantial alignment from said base plate.

8. An oil well rig drive comprising: a base plate; a motor; a speed-reducing control unit; a main shaft carrying a quill; a crank; a clutch element and a brake, all of the mentioned members being disposed substantially in coaxial alignment; and means rendering said motor, said control unit, said clutch and said brake all manipulable by a single operative at a remote point.

9. An oil well rig drive comprising: a base plate; a motor; a speed reducing control unit; a main shaft carrying a crank and a plurality of quills, each engageable by a clutch and each provided with a brake; and means for supporting all of the mentioned elements substantially in alignment on said base plate.

10. An oil well rig drive comprising: a motor; a main shaft disposed coaxially therewith and carrying a crank and a quill, the latter being engageable by a clutch; and means comprising a control unit for varying the speed of said shaft relatively to that of said motor, during continuous operation thereof.

11. In a well rig drive: a drive shaft, a main driven shaft provided with a beam-reciprocating crank; means interposed between said shafts for varying, at will, or in a predetermined ratio, the rate of rotation of said driven shaft relative to said drive shaft; a quill mounted on said driven shaft, and provided with a calf wheel; and means for causing, at will, said quill to rotate with said shaft,—all of the mentioned members being disposed substantially in coaxial alignment.

12. In a well rig drive: a drive shaft; a driven main shaft provided with a beam-reciprocating crank; means interposed between said shafts for varying at will, or in a predetermined ratio, the rate of rotation of said driven shaft relative to said drive shaft; a pair of quills, on said driven shaft, respectively carrying a sand reel and a calf wheel; and means for causing, at will, either of said quills to rotate with said shaft,—all of the mentioned members being disposed substantially in coaxial alignment.

13. In a well rig drive: a drive shaft; a driven main shaft; means interposed between said shafts for varying, at will, or in a predetermined ratio, the rate of rotation of said driven shaft relative to said drive shaft; a pair of quills on said driven shaft, respectively carrying a sand reel and a calf wheel; means for causing, at will, either of said quills to rotate with said shaft,—all of the mentioned members being disposed substantially in coaxial alignment.

14. In a well rig drive: a drive shaft; a main driven shaft; a beam-reciprocating crank mounted on said driven shaft; means interposed between said shafts for varying, at will, or in a predetermined ratio, the rate of rotation of said driven shaft relative to said drive shaft; a quill provided with a calf wheel mounted on said driven shaft; means for causing, at will, said quill to rotate with said shaft; and braking means carried by said quill,—all of the mentioned members being disposed substantially in coaxial alignment.

15. In a well rig drive: a drive shaft; a driven main shaft; means interposed between said shafts for varying, at will, or in a predetermined ratio, the rate of rotation of said driven shaft relative to said drive shaft: a beam-reciprocating crank mounted on said driven shaft; a pair of quills on said shaft, respectively carrying a sand reel and a calf wheel; means for causing, at will, either of said quills to rotate with said shaft; and braking means carried by one of said quills,—all of the mentioned members being disposed substantially in coaxial alignment.

16. In a well rig drive: a drive shaft; a driven main shaft; means interposed between said shafts for varying, at will, or in a predetermined ratio, the rate of rotation of said driven shaft relative to said drive shaft; a pair of quills, on said driven shaft, respectively carrying a sand reel and a calf wheel; means for causing, at will, either of said quills to rotate with said shaft; and braking means carried by both of said quills, all of the mentioned members being disposed substantially in coaxial alignment.

In testimony whereof, I have hereunto set my hand at Los Angeles, California, this 5th day of April 1926.

JOHN S. WATTS.